(12) United States Patent
Handley

(10) Patent No.: US 10,619,656 B1
(45) Date of Patent: Apr. 14, 2020

(54) FLUID TURBULENCE INDUCEMENT APPARATUS AND SYSTEM

(71) Applicant: Daniel A. Handley, Chicago, IL (US)

(72) Inventor: Daniel A. Handley, Chicago, IL (US)

(*) Notice: Subject to any disclaimer, the term of this patent is extended or adjusted under 35 U.S.C. 154(b) by 55 days.

(21) Appl. No.: 15/609,102

(22) Filed: May 31, 2017

(51) Int. Cl.
*F15D 1/02* (2006.01)
*F23K 5/00* (2006.01)
*F23D 14/70* (2006.01)
*F16L 15/00* (2006.01)

(52) U.S. Cl.
CPC ............ *F15D 1/025* (2013.01); *F23D 14/70* (2013.01); *F23K 5/002* (2013.01); *F16L 15/006* (2013.01)

(58) Field of Classification Search
CPC .......... F15D 1/025; F23D 14/70; F23K 5/002; F16L 15/006
USPC .............................................. 138/39, 41, 44
See application file for complete search history.

(56) References Cited

U.S. PATENT DOCUMENTS

| | | | | |
|---|---|---|---|---|
| 3,894,562 A | * | 7/1975 | Moseley, Jr. ............. | F15D 1/02 138/44 |
| 6,695,010 B2 | * | 2/2004 | Robison .................... | F15D 1/02 138/39 |
| 7,086,417 B2 | * | 8/2006 | De Almeida ............. | F04F 1/20 138/44 |
| 7,089,963 B2 | * | 8/2006 | Meheen .................... | F01D 9/06 138/37 |
| 7,487,800 B2 | * | 2/2009 | Lammers ............... | A61M 5/141 138/37 |
| 8,578,971 B2 | * | 11/2013 | Brown .................... | G01F 1/662 138/44 |
| 8,763,643 B2 | * | 7/2014 | Bezek ..................... | F16L 55/24 138/155 |
| 2008/0142089 A1 | * | 6/2008 | Fiske .................. | F24D 17/0078 137/334 |
| 2009/0071561 A1 | * | 3/2009 | Dalrymple ............... | F15D 1/02 138/44 |
| 2009/0090424 A1 | * | 4/2009 | Kondo .................... | B01F 5/045 138/39 |
| 2010/0071793 A1 | * | 3/2010 | Warnica ................... | F15D 1/08 138/39 |
| 2013/0153074 A1 | * | 6/2013 | Gurr ........................ | F15D 1/06 138/39 |
| 2015/0083105 A1 | * | 3/2015 | Akbarimonfared ..... | F23D 14/08 126/116 R |

* cited by examiner

*Primary Examiner* — Craig M Schneider
*Assistant Examiner* — David R Deal
(74) *Attorney, Agent, or Firm* — Scherrer Patent & Trademark Law, P.C.; Stephen T. Scherrer; Monique A. Morneault

(57) ABSTRACT

Fluid turbulence inducement apparatus and systems comprise a housing that is disposed in-line in a pipe through which natural gas flows toward a combustion element. Specifically, the pipe provides a source of natural gas for combustion of the same. The housing comprises an angled inlet and angled outlet, and further comprises an atomizer disposed on an end of the angled outlet comprising a plate having a plurality of holes therein.

18 Claims, 3 Drawing Sheets

FLUID TURBULENCE INDUCEMENT APPARATUS AND SYSTEM

TECHNICAL FIELD

The present invention relates to apparatus for inducing turbulence in a fluid stream and systems. Specifically, the apparatus comprises a housing that is disposed in-line in a pipe through which fluid, such as natural gas, flows toward a combustion element. Specifically, the pipe provides a source of fluid for combustion of the same. The housing comprises an angled inlet and angled outlet, and further comprises an element for inducing turbulence disposed on an end of the angled outlet comprising a plate having a plurality of holes therein.

BACKGROUND

It is, of course, generally known to feed a combustible fluid, such as natural gas, into a combustion element for combusting the same for heating. Natural gas is commonly known as a relatively clean source of hydrocarbons, mainly methane gas, that is typically used for heating, cooking and electricity generation. Often, natural gas is delivered from storage containers, such as storage tanks, for use when needed, or is otherwise transported to the point of use through pipes. In any event, natural gas is typically moved to a combustion element via pipes. In many cases, natural gas is stored in a liquefied state and delivered to a combustion element, where it is depressurized and vaporized for combustion.

When needed, natural gas typically flows through a pipe to a gas burner, which typically mixes the natural gas with a source of oxygen, normally air. In many instances, the pipe is narrowed immediately prior to exiting the pipe to speed up the gas and drop the pressure. At this point, air or another source of oxygen is introduced into the pipe to mix with the natural gas, which then is ignited as it exits the pipe. Forward momentum from the velocity and lower pressure of the stream of natural gas within the tube prevents the natural gas from igniting within the pipe.

As natural gas flows from the pipe, only a portion of the natural gas combusts.

Specifically, the combusted fraction of natural gas produces heat, along with carbon dioxide, water and other molecules from impurities within the natural gas. The un-combusted fraction flows out of the pipe and into the atmosphere, where it is lost. A need, therefore, exists for apparatus for inducing turbulence in a fluid stream and systems that aid in the combustion of natural gas. Specifically, a need exists for apparatus for inducing turbulence in a fluid stream and systems that increase the efficiency of natural gas combustion. More specifically, a need exists for apparatus for inducing turbulence in a fluid stream and systems that increase the combusted fraction of the natural gas.

Inefficient combustion of natural gas, wherein the combustion of the natural gas produces a relatively large fraction of un-combusted natural gas, wastes money, as more amounts of natural gas fed into combustion flames is required to produce heat for heating, cooking or energy generation. Therefore, a need exists for apparatus for inducing turbulence in a fluid stream and systems that save money by more efficiently burning natural gas. Likewise, inefficient burning of natural gas can cause the release of hydrocarbons into the atmosphere, which may be dangerous to individuals that may breathe the un-combusted natural gas, and that may also contribute to global climate change. A need, therefore, exists for apparatus for inducing turbulence in a fluid stream and systems that decrease danger to individuals that may otherwise breathe the un-combusted natural gas. In addition, a need exists for apparatus for inducing turbulence in a fluid stream apparatus and systems that decrease hydrocarbon contributions to global climate change.

SUMMARY OF THE INVENTION

The present invention relates to apparatus for inducing turbulence in a fluid stream and systems. Specifically, the apparatus comprises a housing that is disposed in-line in a pipe through which fluid, such as natural gas, flows toward a combustion element. Specifically, the pipe provides a source of fluid for combustion of the same. The housing comprises an angled inlet and angled outlet, and further comprises an element for inducing turbulence disposed on an end of the angled outlet comprising a plate having a plurality of holes therein.

To this end, in an embodiment of the present invention, a fluid turbulence inducement apparatus is provided. The apparatus comprises: a housing having a first end and a second end, the first and second ends having connection elements for connecting to first and second lines and configured to allow a fluid to flow through a path from the second end of the housing to the first end of the housing; an element at the first end of the housing, the element extending across the path of fluid flow therethrough, the element comprising a plurality of holes to induce turbulence into the fluid flowing therethrough, wherein the housing further comprises an internal surface, the internal surface comprising a funneled outlet in proximity to the first end and a funneled inlet in proximity to the second end.

In an embodiment, the first end of the housing comprises threads configured to threadedly engage with a fluid line.

In an embodiment, the second end of the housing comprises threads configured to threadedly engage with a fluid line.

In an embodiment, the first end of the housing comprises first threads configured to threadedly engage with a first fluid line and the second end of the housing comprises second threads configured to threadedly engage with a second fluid line.

In an embodiment, apparatus further comprises: a section disposed between the funneled inlet and the funneled outlet.

In an embodiment, the section disposed between the funneled inlet and the funneled outlet has a constant distance in cross-section from the funneled inlet to the funneled outlet.

In an embodiment, the element at the first end of the housing comprises a screen.

In an embodiment, each of the plurality of holes in the element at the first end of the housing comprises a funneled inlet and a funneled outlet.

In an embodiment, each of the plurality of holes in the element at the first end of the housing further comprises a section between the funneled inlet and the funneled outlet.

In an embodiment, the section between the funneled inlet and the funneled outlet has a constant distance in cross section from the funneled inlet to the funneled outlet.

In an alternate embodiment of the present invention, a method of inducing turbulence in a fluid stream is provided. The method comprises the steps of: providing a first fluid line and a second fluid line, and an apparatus disposed between and connected to the first fluid line and the second fluid line, the apparatus comprising a housing having a first end and a second end, the first and second ends having connection elements for connecting to the first and second fluid lines, respectively, and configured to allow a fluid to flow through a path from the second end of the housing to the first end of the housing, an element at the first end of the housing, the element extending across the path of fluid flowing therethrough, the element comprising a plurality of holes to induce turbulence into the fluid flowing therethrough, wherein the housing further comprises an internal surface, the internal surface comprising a funneled outlet in proximity to the first end and a funneled inlet in proximity to the second end; connecting the apparatus to the first and second fluid lines.

In an embodiment, the first end of the housing comprises first threads and the second end of the housing comprises second threads.

In an embodiment, the method further comprises the step of: threadedly engaging the first and second ends of the housing to the first and second fluid lines, respectively.

In an embodiment, the method further comprises the steps of: engaging the first end of the housing to the first fluid line; and engaging the second end of the housing to the second fluid line.

In an embodiment, the second fluid line terminates at a gas burner, and the apparatus is connected to the second fluid line proximal to the gas burner.

In an embodiment, the housing further comprises a section disposed between the funneled inlet and the funneled outlet, wherein the section has a constant distance in cross-section from the funneled inlet to the funneled outlet.

In an embodiment, the element at the first end of the housing comprises a screen.

In an embodiment, each of the plurality of holes in the element at the first end of the housing comprises a funneled inlet and a funneled outlet.

In an embodiment, each of the plurality of holes in the element at the first end of the housing further comprises a section between the funneled inlet and the funneled outlet.

In an embodiment, the section between the funneled inlet and the funneled outlet has a constant distance in cross section from the funneled inlet to the funneled outlet.

It is, therefore, an advantage and objective of the present invention to provide apparatus for inducing turbulence in a fluid stream and systems that aid in the combustion of natural gas.

Specifically, it is an advantage and objective of the present invention to provide apparatus for inducing turbulence in a fluid stream and systems that increase the efficiency of natural gas combustion.

More specifically, it is an advantage and objective of the present invention to provide apparatus for inducing turbulence in a fluid stream and systems that increase the combusted fraction of the natural gas.

Further, it is an advantage and objective of the present invention to provide apparatus for inducing turbulence in a fluid stream and systems that save money by more efficiently burning natural gas.

Still further, it is an advantage and objective of the present invention to provide apparatus for inducing turbulence in a fluid stream and systems that decrease danger to individuals that may otherwise breathe the un-combusted natural gas.

In addition, it is an advantage and objective of the present invention to provide apparatus for inducing turbulence in a fluid stream and systems that decrease hydrocarbon contributions to global climate change.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to apparatus for inducing turbulence in a fluid stream and systems. Specifically, the apparatus comprises a housing that is disposed in-line in a pipe through which fluid, such as natural gas, flows toward a combustion element. Specifically, the pipe provides a source of fluid for combustion of the same. The housing comprises an angled inlet and angled outlet, and further comprises an element for inducing turbulence disposed on an end of the angled outlet comprising a plate having a plurality of holes therein.

Although the present invention refers to natural gas, it should be noted that the present invention may further be utilized generally with fluids of any nature, with liquids or gases in which turbulent flow is imparted to aid in the combustion of the same. Thus, any fluid, such as any liquid or gas, may be utilized in the present invention, and the invention should not be limited as described herein.

Figure 1:
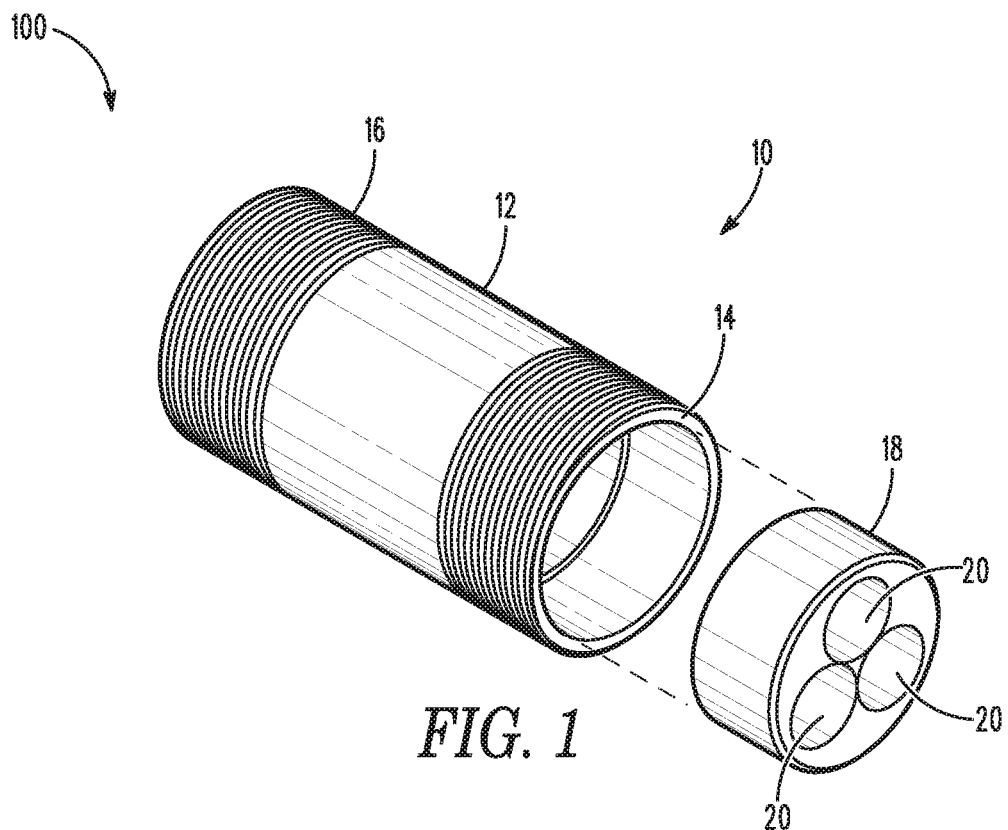
FIG. 1 illustrates a perspective exploded view of a natural gas atomization apparatus in an embodiment of the present invention.
Figure 4:
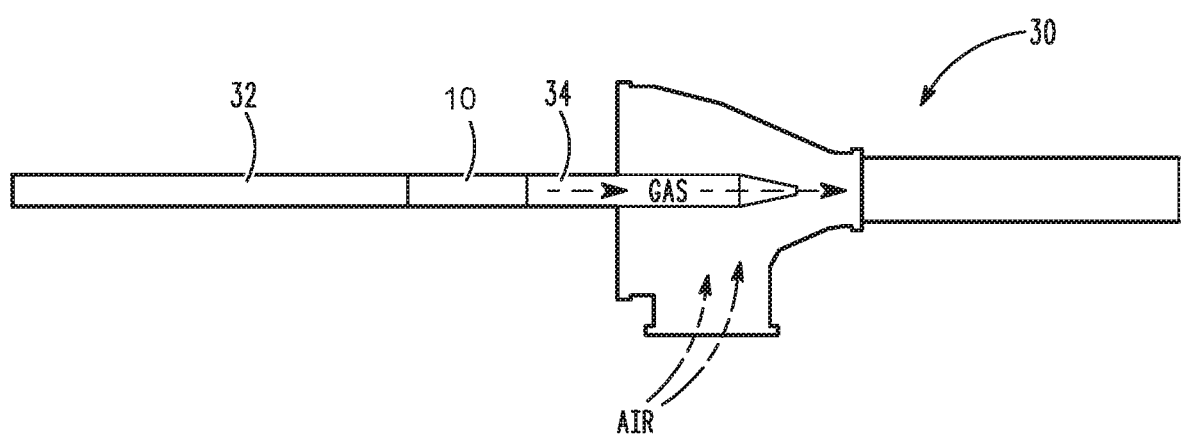
FIG. 4 illustrates a representation of the present invention of a natural gas atomization apparatus in-line with a gas line feeding a gas burner in an embodiment of the present invention.

Now referring to the figures, wherein like numerals refer to like parts, FIG. 1 illustrates a perspective exploded view of a fluid turbulence inducement apparatus 10 in an embodiment of the present invention. The fluid turbulence inducement apparatus 10 may comprise a body or housing 12 having a first end 14 and a second end 16. The apparatus 10 may feed gas to a gas burner 30 and further may be interconnected with gas lines 32, 34, as illustrated in FIG. 4, and thus may have connection means on the first and second ends 14, 16 thereof. As illustrated in FIG. 1, first and second ends 14, 16 may be threaded to threadedly engage with gas lines 32, 34, as shown in FIG. 4. Although the first and second ends 14, 16 are shown as threaded on outside surfaces thereof, it should be noted that any mechanism for connecting the same to gas lines may be utilized and the present invention should not be limited as described herein.

Figure 2:
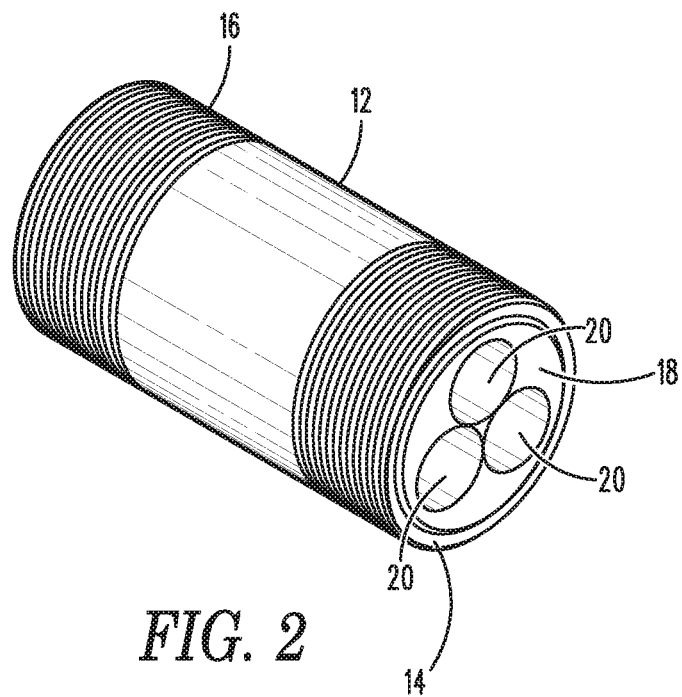
FIG. 2 illustrates a perspective view of a natural gas atomization apparatus in an embodiment of the present invention.

Disposed on first end 14 may be a turbulence inducement element 18, shown in the exploded view in FIG. 1, and shown seated within the first end 14 of the body or housing 12 in FIG. 2. The atomization element 18 may have a plurality of holes 20 disposed therein for allowing gas to flow therethrough. Preferably, natural gas flows through the apparatus 10 from second end 16 to first end 14. Thus, the natural gas flowing therethrough may initially traverse the body or housing 12, and further may have turbulence induced therein through the plurality of holes 20 disposed in the turbulence inducement element 18.

The turbulence inducement element 18 may create turbulence in the natural gas stream flowing therethrough, and may thus aid in combustion of the same as it traverses into gas burner 30, as illustrated in FIG. 4. Moreover, the holes 20 may provide extensive metal to gas contact, which may further induce turbulent flow, but may also induce an electrical charge to the gas flowing therethrough.

Figure 3:
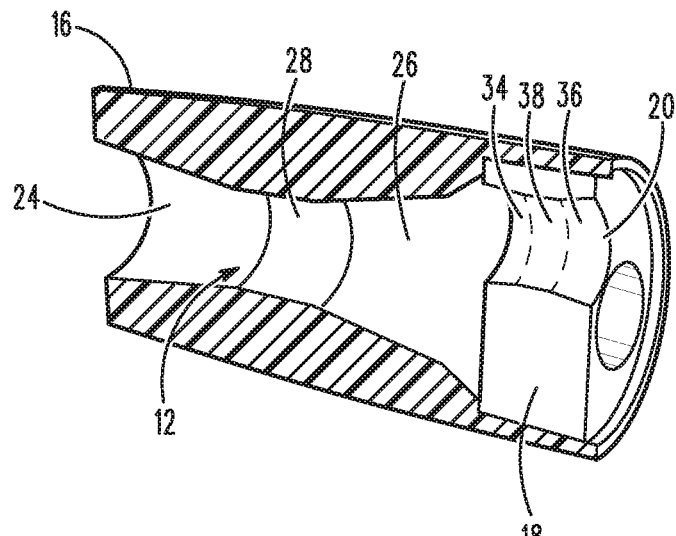
FIG. 3 illustrates a cut-away view of a natural gas atomization apparatus in an embodiment of the present invention.

FIG. 3 illustrates a cut-away view of the fluid turbulence inducement apparatus 10, showing the constricted path 22 through the apparatus 10. The natural gas may enter through second end 16 and be constricted as it traverses through the body or housing 12. The constricted path 22 through which the natural gas may flow therethrough may comprise a funneled inlet 24 and a funneled outlet 26 separated by a constant cross-section portion 28 therebetween. The funneled inlet 24 may draw natural gas inwardly and increase the speed of the natural gas as the volume is constricted. The funneled outlet 26 may expel natural gas outwardly and decrease the speed of the natural gas as the volume expands. The change in the speed and volume of the natural gas through the funneled inlet 24 and funneled outlet 26 may create a Venturi effect on the stream of fluid flowing therethrough.

Likewise, as the natural gas flows to the first end 14 of the body or housing 12, it may be guided through the plurality of holes 20 disposed in the turbulence inducement element 18. Each of the holes 20 in the turbulence inducement element 18 may further have a funneled inlet 34 and a funneled outlet 36 separated by a constant cross-section portion 38 therebetween. The funneled inlet 34 may draw natural gas inwardly and increase the speed of the natural gas as the volume is constricted. The funneled outlet 36 may expel natural gas outwardly and decrease the speed of natural gas as the volume expands. The change in the speed and volume of the natural gas through the funneled inlet 24 and funneled outlet 26 may create a Venturi effect as the gas flows through each of the holes 20.

Because the natural gas stream through the body or housing 12 is divided into several sub-streams as the natural gas flows through each of the holes 20, the holes 20 may induce turbulence in the stream of natural gas that may aid in the combustion thereof. Moreover, due to significant metal to natural gas contact, an electrical charge may be induced in the natural gas, which may also aid in the combustion thereof when the natural gas reaches a burner 30, as illustrates in FIG. 4.

Figure 5:
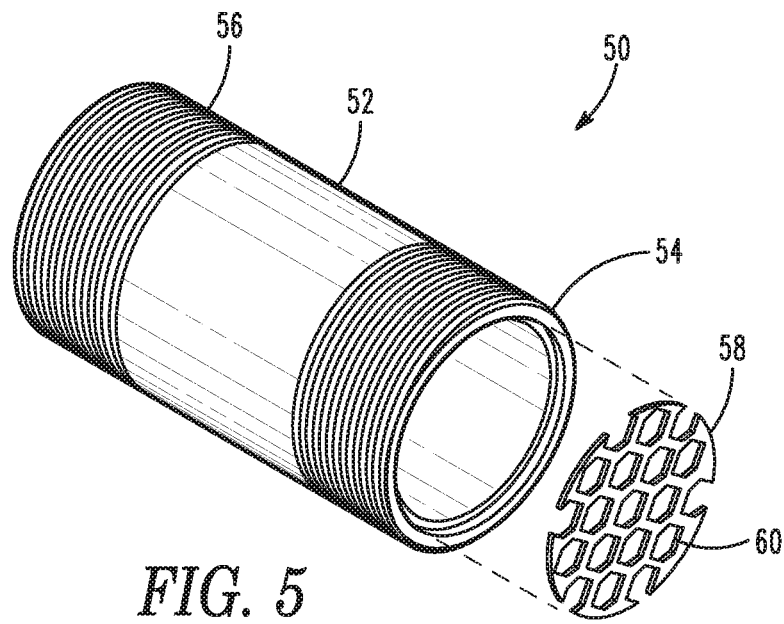
FIG. 5 illustrates a perspective exploded view of a natural gas atomization apparatus in an alternate embodiment of the present invention.
Figure 6:
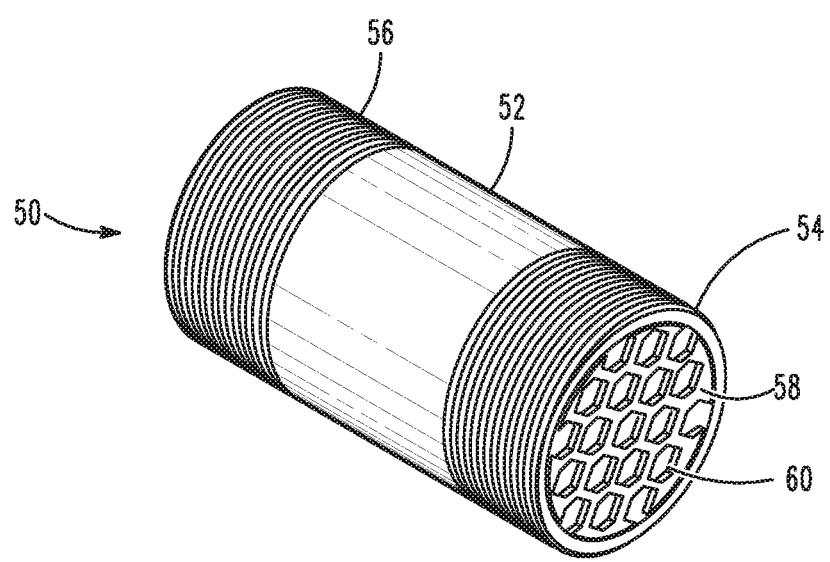
FIG. 6 illustrates a perspective view of a natural gas atomization apparatus in an embodiment of the present invention.

FIGS. 5 and 6 illustrate an alternate embodiment of a gas atomization apparatus 50 comprising a body or housing 52 that may be similar to body or housing 12, as illustrated above with reference to FIGS. 1-3. The body or housing 52 may have first end 54 and second end 56. Moreover, the body or housing 52 may have the same internal constricting surface as described above, creating a Venturi effect in the stream of natural gas flowing therethrough due to constriction and expansion of the volume the natural gas traverses therethrough. However, disposed on first end 54 may be a screen 58 disposed on or in the second end 54. The screen may have a plurality of holes 60 which may break up the natural gas stream into several sub-streams, thereby inducing turbulence and/or an electrical charge to the natural gas stream flowing therethrough. The screen 58, as illustrated in FIGS. 5 and 6, may have a pattern of holes 60, such as hexagonal holes, although any size and shape holes may be utilized in the present invention, and the present invention should not be limited as described herein.

In an alternate embodiment, a plurality of screens may be stacked one atop another on or in the second end 54. Each of the plurality of screens may have a plurality of holes which may break up the natural gas stream and induce turbulence into the natural gas stream. The holes of the plurality of screens may be aligned with each other, or unaligned to create a twisting path for the natural gas stream as it traverses through the holes in the plurality of screens.

The present invention may be utilized in various applications where a fluid may flow through a pipe, wherein inducing turbulence and/or an electrical charge on the fluid flow may aid in its use. For example, the apparatus may be used in stoves, ovens, barbecue grills, or with any heating element requiring the flow of gas and combustion thereof. Moreover, the apparatus of the present invention may be utilized in or with engines, such as automobile engines and the like prior to combustion of fuel. Likewise, the apparatus may be used in the cooling industry where inducing turbulence in a compressible gas as it flows through a cooling system may be useful.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A fluid turbulence inducement apparatus comprising:
   a housing having a first end and a second end, the first and second ends having connection elements for connecting to first and second lines and configured to allow a fluid to flow through a path from the second end of the housing to the first end of the housing; and
   an element at the first end of the housing, the element extending across the path of fluid flow therethrough, the element comprising a plurality of holes to induce turbulence into the fluid flowing therethrough wherein each of the plurality of holes in the element at the first end of the housing comprises a funneled inlet and a funneled outlet,
   wherein the housing further comprises an internal surface, the internal surface comprising a funneled outlet in proximity to the first end and a funneled inlet in proximity to the second end, wherein the funneled inlet decreases in cross-section from a first diameter to a second diameter within the housing, and the funneled outlet increases in cross-section from the second diameter.

2. The fluid turbulence inducement apparatus of claim 1 wherein the first end of the housing comprises threads configured to threadedly engage with a fluid line.

3. The fluid turbulence inducement apparatus of claim 1 wherein the second end of the housing comprises threads configured to threadedly engage with a fluid line.

4. The fluid turbulence inducement apparatus of claim 1 wherein the first end of the housing comprises first threads configured to threadedly engage with a first fluid line and the second end of the housing comprises second threads configured to threadedly engage with a second fluid line.

5. The fluid turbulence inducement apparatus of claim 1 further comprising:
   a section disposed between the funneled inlet and the funneled outlet.

6. The fluid turbulence inducement apparatus of claim 5 wherein the section disposed between the funneled inlet and the funneled outlet has a constant distance in cross-section from the funneled inlet to the funneled outlet.

7. The fluid turbulence inducement apparatus of claim 1 wherein the element at the first end of the housing is a screen.

8. The fluid turbulence inducement apparatus of claim 1 wherein each of the plurality of holes in the element at the first end of the housing further comprises a section between the funneled inlet and the funneled outlet.

9. The fluid turbulence inducement apparatus of claim 8 wherein the section between the funneled inlet and the funneled outlet has a constant distance in cross section from the funneled inlet to the funneled outlet.

10. A method of inducing turbulence in a fluid stream, the method comprising the steps of:
   providing a first fluid line and a second fluid line, and an apparatus disposed between and connected to the first fluid line and the second fluid line, the apparatus comprising a housing having a first end and a second end, the first and second ends having connection elements for connecting to the first and second fluid lines, respectively, and configured to allow a fluid to flow through a path from the second end of the housing to the first end of the housing, an element at the first end of the housing, the element extending across the path of fluid flowing therethrough, the element comprising a plurality of holes to induce turbulence into the fluid flowing therethrough wherein each of the plurality of holes in the element at the first end of the housing comprises a funneled inlet and a funneled outlet, wherein the housing further comprises an internal surface, the internal surface comprising a funneled outlet in proximity to the first end and a funneled inlet in proximity to the second end, wherein the funneled inlet decreases in cross-section from a first diameter to a second diameter within the housing, and the funneled outlet increases in cross-section from the second diameter; and
   connecting the apparatus to the first and second fluid lines.

11. The method of claim 10 wherein the first end of the housing comprises first threads and the second end of the housing comprises second threads.

12. The method of claim 11 further comprising the step of:
   threadedly engaging the first and second ends of the housing to the first and second fluid lines, respectively.

13. The method of claim 10 further comprising the steps of:
   engaging the first end of the housing to the first fluid line; and
   engaging the second end of the housing to the second fluid line.

14. The method of claim 10 wherein the second fluid line terminates at a gas burner, and the apparatus is connected to the second fluid line proximal to the gas burner.

15. The method of claim 10 wherein the housing further comprises a section disposed between the funneled inlet and the funneled outlet, wherein the section has a constant distance in cross-section from the funneled inlet to the funneled outlet.

16. The method of claim 10 wherein the element at the first end of the housing is a screen.

17. The method of claim 10 wherein each of the plurality of holes in the element at the first end of the housing further comprises a section between the funneled inlet and the funneled outlet.

18. The method of claim 17 wherein the section between the funneled inlet and the funneled outlet has a constant distance in cross section from the funneled inlet to the funneled outlet.

* * * * *